(12) United States Patent
Kimbrell et al.

(10) Patent No.: US 9,696,509 B2
(45) Date of Patent: Jul. 4, 2017

(54) HIGH RELIABILITY ARMORED TERMINATION/EPOXY GLAND

(71) Applicant: AFL Telecommunications LLC, Duncan, SC (US)

(72) Inventors: Eddie Kimbrell, Dacula, GA (US); John Toth, Clermont, FL (US); Ted Lichoulas, Simpsonville, SC (US); Lou Guzzo, Inman, SC (US)

(73) Assignee: AFL Telecommunications LLC, Duncan, SC (US)

( * ) Notice: Subject to any disclaimer, the term of this patent is extended or adjusted under 35 U.S.C. 154(b) by 32 days.

(21) Appl. No.: 14/347,099

(22) PCT Filed: Sep. 26, 2012

(86) PCT No.: PCT/US2012/057360
§ 371 (c)(1),
(2) Date: Mar. 25, 2014

(87) PCT Pub. No.: WO2013/049225
PCT Pub. Date: Apr. 4, 2013

(65) Prior Publication Data
US 2014/0233898 A1     Aug. 21, 2014

Related U.S. Application Data

(60) Provisional application No. 61/539,081, filed on Sep. 26, 2011.

(51) Int. Cl.
G02B 6/44     (2006.01)

(52) U.S. Cl.
CPC ........... *G02B 6/443* (2013.01); *G02B 6/4428* (2013.01); *G02B 6/4486* (2013.01); *Y10T 29/49826* (2015.01)

(58) Field of Classification Search
CPC ............... G02B 6/4428; G02B 6/4486; Y10T 29/49826
(Continued)

(56) References Cited

U.S. PATENT DOCUMENTS 4,598,290 A * 7/1986 Collins ............... E21B 33/0355
                                                                174/11 R
4,679,250 A * 7/1987 Davis ................... G02B 6/4448
                                                                165/80.3
(Continued)

OTHER PUBLICATIONS

Chinese Office Action dated Sep. 5, 2016 as issued for Chinese Appl. No. 201280058041.5 (1 page).

*Primary Examiner* — Ryan Lepisto
*Assistant Examiner* — Guy Anderson
(74) *Attorney, Agent, or Firm* — Dority & Manning, P.A.

(57) ABSTRACT

An armored cable termination/fiber-optic seal which connects a fiber optic cable—the fiber optic cable including one or more armor wires and one or more cable tubes—to a pressure housing, the armored cable termination/fiber-optic seal including: an armored termination which locks the one or more armor wires in a conical cavity; sealing paths which block water from traveling in the interstitial space between the one or more armor wires and the one or more cable tubes into the pressure housing; and fiber feed-through tubes which block water from traveling in the interior of the one or more cable tubes into the pressure housing.

52 Claims, 5 Drawing Sheets

(58) Field of Classification Search
USPC ............... 385/100–101, 106–107, 25–26
See application file for complete search history.

(56) References Cited

U.S. PATENT DOCUMENTS

| | | | | |
|---|---|---|---|---|
| 4,682,848 A * | 7/1987 | Cairns | ............... | G02B 6/3816 385/69 |
| 4,733,935 A * | 3/1988 | Gandy | ............... | G02B 6/3816 385/69 |
| 4,753,500 A | 6/1988 | Guazzo | | |
| 5,125,062 A * | 6/1992 | Marlier | ............... | G02B 6/4416 174/70 R |
| 5,212,755 A * | 5/1993 | Holmberg | ........... | G02B 6/4429 385/104 |
| 5,485,745 A * | 1/1996 | Rademaker | ........... | E21B 17/203 340/854.7 |
| 5,648,639 A * | 7/1997 | Hand | ............... | H01R 4/60 174/51 |
| 5,675,120 A * | 10/1997 | Craft | ............... | H05K 5/06 174/538 |
| 5,691,505 A * | 11/1997 | Norris | ............... | H02G 15/04 174/51 |
| 5,771,927 A * | 6/1998 | Johansen | ............... | E21B 33/038 137/614 |
| 5,873,750 A * | 2/1999 | Cairns | ............... | H01R 13/523 439/587 |
| 6,017,227 A * | 1/2000 | Cairns | ............... | G02B 6/3816 439/138 |
| 6,321,021 B1 * | 11/2001 | Cairns | ............... | G02B 6/4428 385/135 |
| 6,326,550 B1 | 12/2001 | Dyer et al. | | |
| 6,332,787 B1 | 12/2001 | Barlow et al. | | |
| 6,731,849 B1 | 5/2004 | Singh et al. | | |
| 6,796,821 B2 * | 9/2004 | Cairns | ............... | H01R 13/523 439/204 |
| 7,224,872 B2 * | 5/2007 | Goldner | ............... | G01H 9/004 385/100 |
| 7,496,246 B1 * | 2/2009 | Ruffa | ............... | G01D 5/35303 385/13 |
| 7,522,794 B2 | 4/2009 | Martin, Jr. | | |
| 7,738,759 B2 | 6/2010 | Parikh et al. | | |
| 8,718,430 B2 * | 5/2014 | Chatigny | ........... | G02B 6/03611 385/126 |
| 8,734,026 B2 * | 5/2014 | Nagengast | ........... | E21B 33/0385 385/147 |
| 2002/0136511 A1 * | 9/2002 | Cecchi | ............... | G02B 6/441 385/109 |
| 2004/0161203 A1 * | 8/2004 | Cull | ............... | G02B 6/3817 385/71 |
| 2006/0120675 A1 * | 6/2006 | Goldner | ............... | G01H 9/004 385/104 |
| 2012/0321264 A1 * | 12/2012 | Chatigny | ........... | G02B 6/03611 385/126 |
| 2013/0044983 A1 * | 2/2013 | Nagengast | ........... | E21B 33/0385 385/77 |

\* cited by examiner

HIGH RELIABILITY ARMORED TERMINATION/EPOXY GLAND

CROSS-REFERENCE TO RELATED APPLICATION

This application is a National Stage of International Application No. PCT/US2012/057360, filed on Sep. 26, 2012, which claims benefit under 35 U.S.C. §119(e) of U.S. Provisional Application No. 61/539,081, filed on Sep. 26, 2011, the disclosure of which is incorporated herein by reference in their entirety.

BACKGROUND

1. Field

This application relates to termination of a subsea fiber optic cable, specifically a small form-factor armored cable termination/fiber-optic seal which facilitates a connection between a subsea fiber optic cable and a pressure housing in an environment with a pressure gradient between the external environment and the pressure housing interior.

2. Description of Related Art

One of the key challenges in subsea system design is to provide a high-reliability, redundant penetration into 1-atmosphere pressure housings. This task is more difficult in subsea optical systems where a fiber optic cable must be cut to allow for interconnection within a pressure housing. The termination going into this housing should ideally seal the cable tubes and fibers to prevent leakage into the pressure housing, while maintaining the original cable break-strength.

Several related art methods exist for cable termination and tube and fiber seals, each of which have their own disadvantages.

Wedge cones, cable compression fittings, and epoxy cones may all be used to terminate various cable types. A wedge cone may be used to terminate armored cable. While wedge cones have sufficiently high strength, wedge cones and housings are specific to their cable type and are labor intensive to terminate. A cable compression fitting which grips cable may be installed with relative ease, but provides relatively lower strength. Epoxy cones—cable tubes and armor wires glued in a cone—can be applied to many cable geometries, but the epoxy used degrades over time and effectiveness is dependent on manufacturing process repeatability.

Methods for tube and fiber seals include Morrison seals, boot seals, epoxy glands, and ferrule based penetrators. Morrison seals provide bi-directional tube sealing while boot seals are limited to single direction sealing. Because Morrison seals and boot seals only block leakage around a cable tube, they are ineffective in the event of a cable tube breach and leakage with in the cable tube. Epoxy glands—wherein an epoxy seals a fiber tube to form a water tight barrier—may be applied to many cable geometries and provide seals for both tubes and fibers. The fibers and tubes are not individually isolated, however, and may allow pressurized water to leak from tube to tube. Ferrule-based penetrators—where ferrule is soldered onto fiber—provides hermetic seal, but are expensive to deploy and requires additional splices in optical system.

Figure 4:
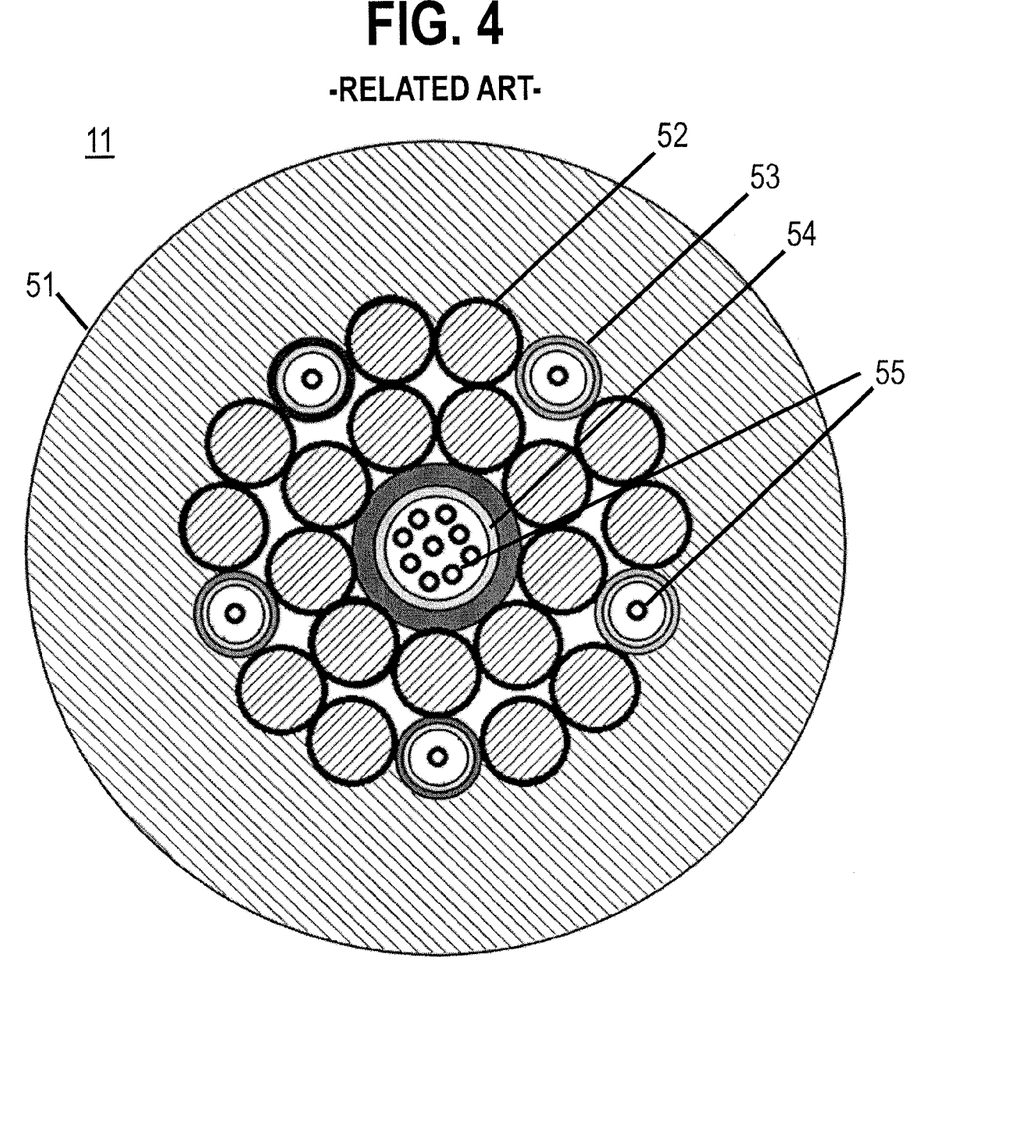
FIG. 4 illustrates a fiber optic cable.

FIG. 4 illustrates one example of a fiber optic cable 11. Referring to FIG. 4, cable 11 may include a stainless steel central tube 54 containing one or more optical fibers 55 and one or more armor wires 52 wrapped around the central tube 54. Additional stainless steel cable tubes 53 containing one or more optical fibers 55 may be interspersed in the cable armor wire layers. Cable 11 is jacketed with a cable sheath 51 (for example, polyethylene, thermoplastic polyurethane, hytrel, etc.). While FIG. 4 illustrates one exemplary embodiment of fiber optic cable 11, one of ordinary skill in the art would recognize that fiber optic cable 11 may be realized using other configurations.

SUMMARY

According to aspects of exemplary embodiments, there is provided: A small form-factor armored cable termination/fiber-optic seal which connects a fiber optic cable—including one or more armor wires and one or more cable tubes—to a pressure or splice housing, the armored cable termination/fiber-optic seal including: an armored termination which locks the one or more armor wires in a conical cavity; sealing paths which block water from traveling in the interstitial space between the one or more armor wires and the one or more cable tubes into the pressure housing; and fiber feed-through tubes which block water from traveling in the interior of the one or more cable tubes into the pressure housing.

BRIEF DESCRIPTION OF THE DRAWINGS

Aspects of exemplary embodiments will be described in detail with reference to the accompanying drawings, in which.

DETAILED DESCRIPTION OF EXEMPLARY EMBODIMENTS

Hereinafter, exemplary embodiments will be described in greater detail with reference to the accompanying drawings.

In the following description, same reference numerals are used for the same elements when they are depicted in different drawings. Elements are described in detail in order to assist in an understanding of exemplary embodiments. Thus, it is apparent that exemplary embodiments may be carried out without those specifically-defined elements. Detailed descriptions of known elements are omitted.

Figure 1:
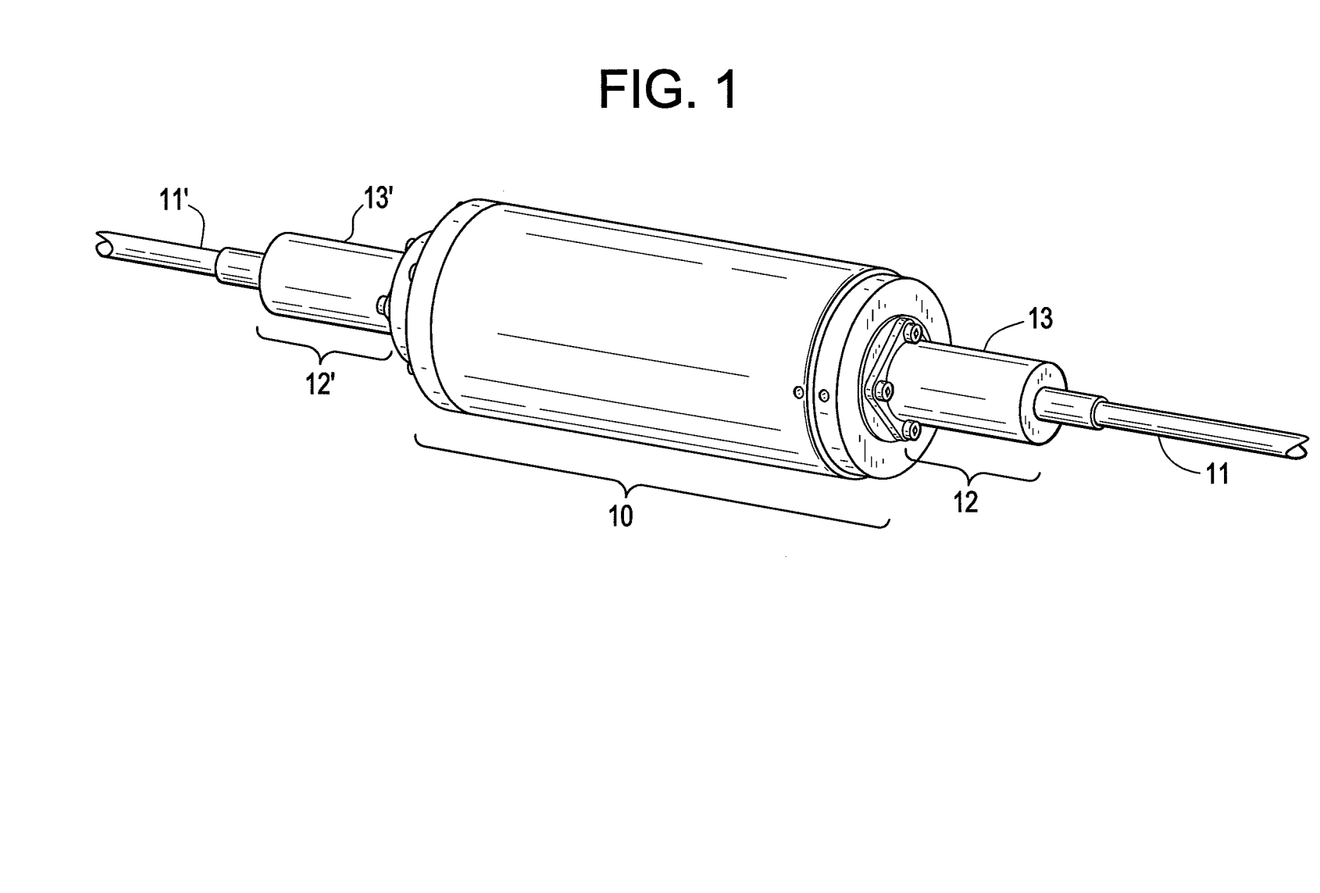
FIG. 1 illustrates a pressure housing with two armored cable termination/fiber-optic seal with overmold according to exemplary embodiments.

FIG. 1 illustrates a cable 11 connected to a pressure housing 10 according to exemplary embodiments.

Referring to FIG. 1, cable 11 is cut to form cable 11 and cable 11' each of which join pressure housing 10 on opposite ends of pressure housing 10 to form an in-line connection. Cable 11 is joined to pressure housing 10 by armored cable termination/fiber-optic seal 12, the exterior portion of which may be covered by overmold 13. Similarly, cable 11' is joined to pressure housing 10 by armored cable termination/fiber-optic seal 12', the exterior portion of which may be covered by overmold 13'.

FIG. 1 shows an in-line installation where armored cable termination/fiber-optic seals 12 and 12' are terminated onto cables 11 and 11', respectively, and armored cable termination/fiber-optic seals 12 and 12' are installed on opposite ends of pressure housing 10. Depending on system design, however, other configurations are possible. For example, pressure housing 10 may accommodate more than one armored cable termination/fiber-optic seal 12 on one or more sides.

Additionally, while FIG. 1 shows overmolds 13 and 13' covering armored cable termination/fiber-optic seals 12 and 12', other configurations are again possible depending on system design. For example, one overmold 13 may cover cable 11', cable termination/fiber-optic seal 12', pressure housing 10, and cable termination/fiber-optic seals 12, and cable 11.

Overmold 13 may be, for example, polyurethane or polyethylene. Overmold 13 relieves the strain on cable 11 as it exits the bond with armored cable termination/fiber-optic seal 12. Overmold 13 may also provide a water barrier at the point where cable 11 enters armored cable termination/fiber-optic seal 12 and/or where cable termination/fiber-optic seal 12 is affixed to pressure housing 10. To maintain a strong bond and an effective water barrier, cable termination/fiber-optic seal 12 and/or pressure housing 10 may be covered in an adhesive (for example, an epoxy) before being covered by overmold 13 as described in more detail below.

Figure 2:
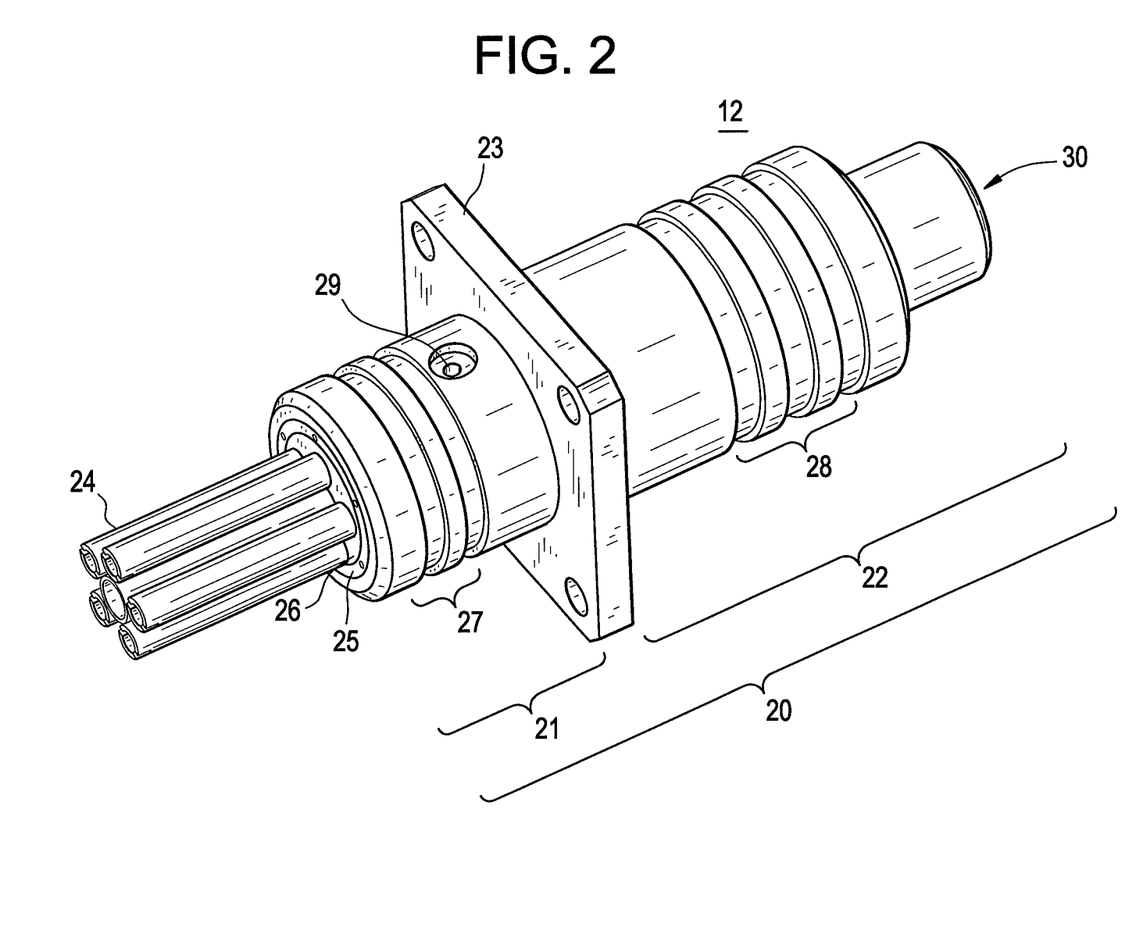
FIG. 2 illustrates an isometric view of an armored cable termination/fiber-optic seal according to exemplary embodiments.

FIG. 2 illustrates an isometric view of armored cable termination/fiber-optic seal 12 according to exemplary embodiments.

Referring to FIG. 2, an armored cable termination/fiber-optic seal 12 may include housing 20 which comprises interior barrel 21 and exterior barrel 22 separated by flange 23. Armored cable termination/fiber-optic seal 12 may further include one or more fiber feed-through tubes 24, retaining ring 25, termination body 26, O-ring grooves 27, ribs 28, helium leak test port 29, and cable entry opening 30. In this view, cable 11 and the overmold 12 are not shown.

When armored cable termination/fiber-optic seal 12 is connected to pressure housing 10, interior barrel 21 and the one or more fiber feed-through tubes 24 may be inserted inside pressure housing 10. Flange 23 is used to mount armored cable termination/fiber-optic seal 12 onto the pressure housing 10 exterior. There are several possible O-ring seals between housing 20 of armored cable termination/fiber-optic seal 12 and the pressure housing 10. One or more additional O-ring grooves may be machined into the flange 23 mating surface or machined into the pressure housing 10 mating surface. A crush O-ring (not pictured) may be added between the intersection of flange 23 and interior barrel 21. The crush O-ring will be crushed as armored cable termination/fiber-optic seal 12 is secured onto pressure housing 10. One or more barrel O-rings (not pictured) may be added to interior barrel 21 of the armored cable termination/fiber-optic seal 12. These O-rings will be crushed as interior barrel 21 is installed in a pass through channel of pressure housing 10. One or more ribs 28 (or knurls) are added to exterior barrel 22 to improve the shear strength between overmold 13 and pressure housing 10.

Figure 3:
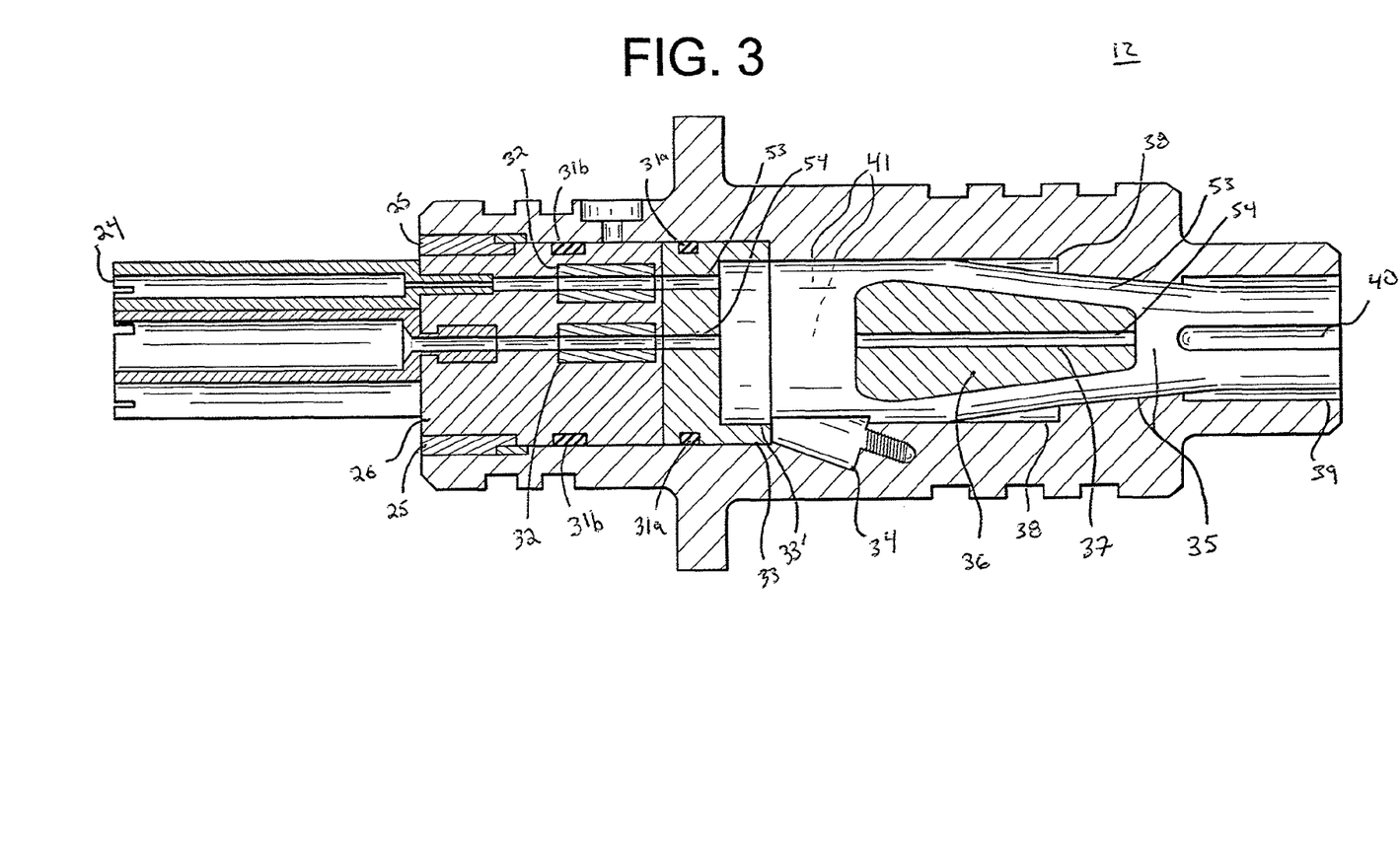
FIG. 3 illustrates a cross-sectional view of armored cable termination/fiber-optic seal according to exemplary embodiments.

FIG. 3 is a cross-sectional view of armored cable termination/fiber-optic seal 12 according to exemplary embodiments.

Referring to FIG. 3, armored cable termination/fiber-optic seal 12 may include termination body 26, O-rings 31a and 31b, one or more of Morrison seals 32, spacer 33 and 33', and ground lug terminal 34. Inside housing 20 is a conical-shaped void space referred to herein as conical cavity 35. Inside conical cavity 35 sits wedge cone 36 which may include one or more tube paths 37 through which center tube 54 and one or more cables 53 may pass through. The exterior barrel 22 may include additional void spaces referred to herein as adhesive torsional lock feature keys 38 and cable entry shear features 39. O-rings 31a and/or 31b may include back-up rings.

Referring to FIGS. 2 through 4, fiber feed-through tubes 24 may be secured into termination body 26. Each fiber feed-through tube 24 may be connected to termination body 26 using a Society of Automotive Engineers (SAE) seal. In an SAE seal, an O-ring is applied to the fiber feed-through tube 24, which is threaded into termination body 26. The fiber feed-through tubes 24 may be removably connected to termination body 26 to allows access to window strip cladding from optical fibers 55 during assembly of the armored cable termination/fiber-optic seal 12. Fiber feed-through tubes 24 may include a 90-degree angled bevel 43 which allows for prevents shear strain and optical loss on optical fibers 55. Retaining ring 25 may have a threaded collar to secure retaining ring 25 to interior barrel 21 of housing 20. Retaining ring 25 may secure termination body 26 within interior barrel 21 of housing 20.

Fiber feed-through tube 24 may be filled with a water-resistant adhesive (for example, an epoxy such as a two-part urethane-based epoxy). Fiber feed-through tubes 24 eliminate any pressure differential on active optical fibers 55 and provides a barrier to stop water from entering pressure housing 10. Fiber feed-through tubes 24 may be optimized with a 45-degree interior wall and the adhesive may be recessed inside fiber feed-through tube 24 to balance the shear and tensile properties of the adhesive.

Cable 11 enters cable entry opening 30. With cable sheath 51 removed, cable tubes 53 and 54 may be routed through tube paths 37. One armor wire 52 is connected to ground lug terminal 34 to provide electrical continuity between armor wires 52, pressure housing 10 and housing 20 of armored cable termination/fiber-optic seal 12.

The remaining armor wires 52 are straightened wrapped over the exterior of wedge cone 36.

An adhesive (for example, an epoxy such as ITW Socketfast or Hysol) may be used to lock wedge cone 36 and armor wires 52 in place (and form what is referred to herein as the "armor-wire-adhesive composite"). The taper angle of conical cavity 35 is designed to provide equal pressure along the wedge length against the armor-wire-adhesive composite. For example, the taper angle of conical cavity 35 may be equal to or greater than the taper angle of the armor-wire-adhesive composite. Therefore, when cable 11 is tensioned, force exerted by the armor-wire-adhesive composite on the conical cavity 35 (and vice versa) is distributed in a substantially equal manner. The armor-wire-adhesive composite provides a cable tension splice lock that exceeds the break strength of cable 11. When cable 11 is tensioned, the armor-wire-adhesive composite prevents the armored cable termination/fiber-optic seal 12 from being the weakest link in the cable system.

The roll-over geometry 42 of wedge cone 36 may reduce the length of wedge cone 36 without a reduction in strength.

Adhesive torsional lock feature keys 38 and cable entry shear features 39 provide channels which are filled by the adhesive. These channels reduce the potential for rotation of the armor-wire-adhesive composite and cable.

Cable tubes 53 and 54 are also routed through holes in the spacer 33 (also known as a tube guide). Spacer 33 is seated on the interior of housing 20 forming a void space between spacer 33 and the armor-wire-adhesive composite. This void space may be filled with an adhesive (for example, an epoxy such as polyurethane). Spacer 33 may include a cap portion 33' made of a material known to bond to polyurethane (for example, Peek or Ultem).

Elastomeric tubing may be applied over cable tubes 53 and 54 to form a band seal 41 which may be subsequently encapsulated when the void space is filled with an adhesive. Individual Morrison seals 32 provide a seal surrounding each cable tube 53 and 54. O-rings 31a and 31b are located in O-ring grooves 27 and provide a redundant seal between armored cable termination/fiber-optic seal 12 and pressure housing 10. Helium test port 29 allows for testing Morrison seals 32 and O-ring 31a during assembly.

Termination body 26 provides an area in which the end of each cable tube 53 and 54 is separated from the water-resistant adhesive in fiber feed-through tube 24.

An adhesive (for example, an epoxy) may be applied to the exterior of housing 20 to prevent delamination of overmold 13 and housing 20 (similarly, if overmold 13 is applied over pressure housing 10, an adhesive may be applied to the exterior of pressure housing 10 as well). The adhesive enters ribs 28, which provide additional protection against shearing forces. Potting flow channels 40 may allow the adhesive applied to the exterior of housing 20 to enter housing 20 and provide an additional barrier against water entering pressure housing 10 and/or may allow the adhesive which forms the armor-wire-adhesive composite to enter the channel and provide additional torsional resistance.

In the event that a cable sheath 51 is breached allowing water to bypass overmold 13, water wicks past wedge cone 36 and the adhesive and band seals 41 form an additional barrier against water entering pressure housing 10. In the event of a tube seal failure in the area of the adhesive and band seals 41, Morisson seals 32 form a secondary barrier against water entering pressure housing 10. In the event of a single tube failure without a breach of cable sheath 51, each individual Morrison seal 32 acts to contain leakage, adhesive within fiber feed-through tubes 24 forms a barrier against water traveling in the interior of a tube into pressure housing 10 and O-ring 31b forms a barrier against water bypassing Morrison seals 32 and entering pressure housing 10. In the event that one or more Morrison seal 32 fails, adhesive within fiber feed-through tubes 24 forms a barrier against water entering pressure housing 10. In the event of a breach to cable sheath 51 and one of the cable tubes 53, adhesive within fiber feed-through tubes 24 forms a barrier against water entering pressure housing 10 through the cable tube 53.

In the event that one of a plurality of cable tubes 53 and 54 is breached, the increased pressure causes any optical fibers 55 within the breached tube to experience optical degradation. Armored cable termination/fiber-optic seal 12, however, may isolate each of the plurality of cable tubes 53 and 54 to prevent pressure increases and optical degradation within an unbreached cable tube 53 and 54.

The armored cable termination/fiber-optic seal 12 may be scalable to accommodate cable tubes 53 and 54 of varying diameters.

Armored cable termination/fiber-optic seal 12 also provides an ability for cable tension testing, hydrostatic testing, and optical continuity testing before integration into a system.

Figure 5:
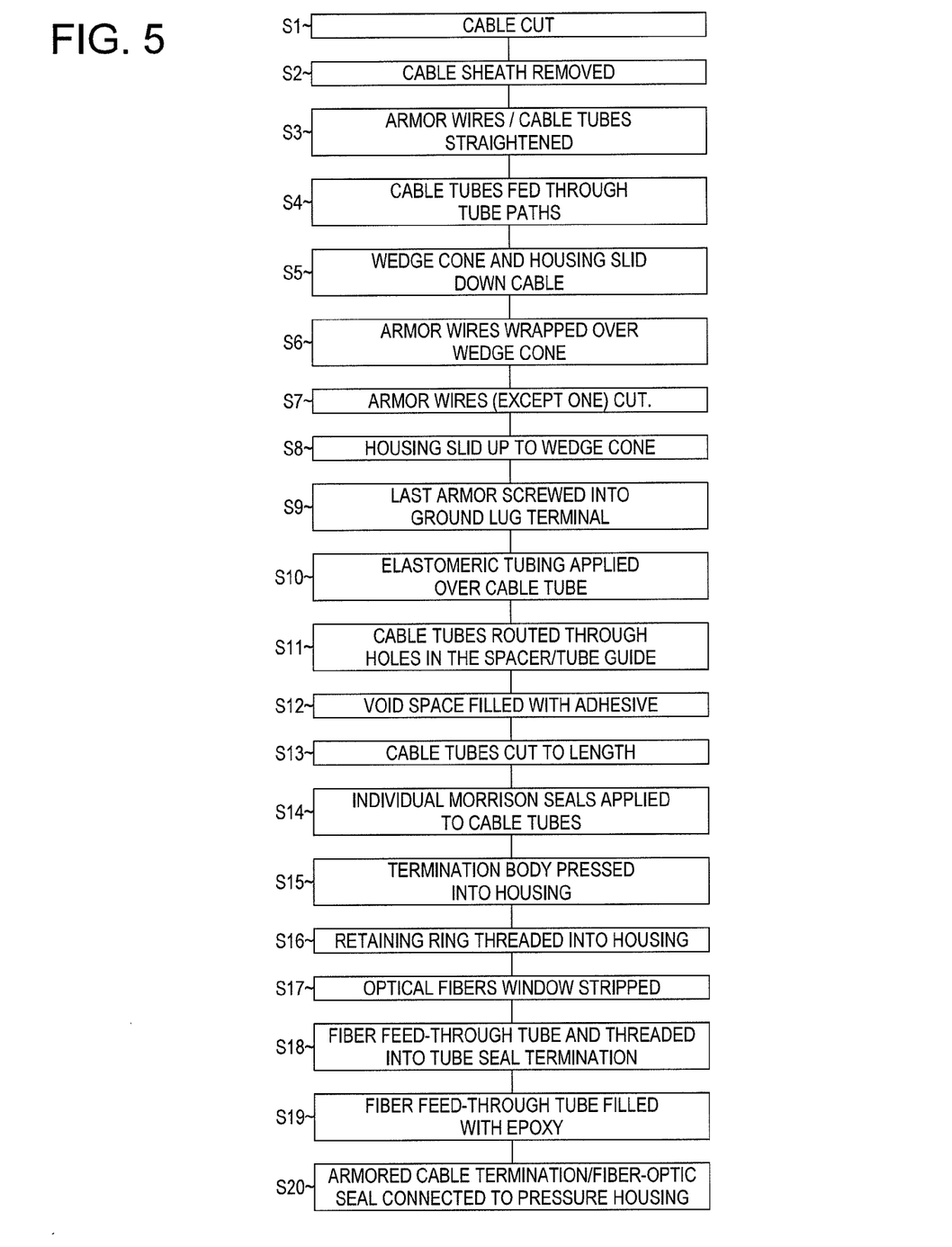
FIG. 5 is a flow-chart illustrating a method of connecting cable 11 to pressure housing 10 of FIG. 1 using armored cable termination/fiber-optic seal 12 of FIGS. 2 and 3 according to exemplary embodiments.

FIG. 5 is a flow-chart illustrating a method of connecting cable 11 of FIG. 4 to housing 10 of FIG. 1 through armored cable termination/fiber-optic seal 12 of FIGS. 2 and 3 according to exemplary embodiments.

Cable 11 is cut in operation S1. The end of cable 11 is prepared by removing a section of cable sheath 51 in operation S2 and unwinding and straightening armor wires 52 and cable tubes 53 in operation S3. Central tube 54 of cable 11 is fed through tube path 42 of wedge cone 36 in operation S4. Wedge cone 36 and housing 20 is slid down cable 11 to a desired point in operation S5.

In operation S6, the straightened armor wires 52 are wrapped over the exterior of wedge cone 36. Armor wires 52 are cut in operation S7. One armor wire 52, however, may be looped for future connection to housing 20 via ground lug terminal 34. (Cable tubes 53 are left uncut.)

In operation S8, housing 20 is slid up to wedge cone 36. A capstan or press may be used to seat the armor wires 52 and wedge cone 36 inside housing 20. An adhesive (for example, an epoxy such as ITW Socketfast or Hysol) may be used to lock wedge cone 36 and the composite of armor wires 52 and adhesive. The looped armor wire 52 is screwed into the ground lug terminal 38 in operation S9.

In operation S10, a section of elastomeric tubing is applied over central tube 54 and cable tubes 53 to form a band seal 41. Cable tubes 54 and 53 are routed through holes in the spacer/tube guide 33 which is seated on the interior of housing 20 to form a void space in operation S11. This void space is filled with an adhesive (for example, an epoxy such as polyurethane) in operation S 12. This adhesive and the band seal 41 around the cable tubes 54 and 53 form a barrier against high pressure water if a leak develops at cable entry opening 30.

Cable tubes 53 and 54 are cut to length in operation S13 and Morrison seals 32 comprising washers and elastomeric tubing is applied to cable tubes 53 and 54 in operation S14. Termination body 26 is pressed into housing 20 in operation S15 and retaining ring 25 is used to locate and secure termination body 26 in operation S16.

Fiber feed-through tubes 24 are applied to the assembly. The optical fibers 55 exiting the cut cable tubes 53 in termination body 26 are window stripped at a point corresponding to intersection of the fiber feed-through tube capillary and the 45 degree expansion in operation S17. Each fiber feed-through tube 24 is threaded into termination body 26 with an O-ring in operation S18. Fiber feed-through tube 24 is filled with an adhesive (for example, an epoxy) in operation S19. Armored cable termination/fiber-optic seal 12 is then connected to pressure housing 10 in operation S20.

The foregoing description of the exemplary embodiments is intended to be illustrative. Many alternatives, modifications, and variations will be apparent to those skilled in the art. Descriptions and features listed in relation to the foregoing exemplary embodiments are not to be construed as limiting the present inventive concept, the scope of which is defined by the following claims.

What is claimed is:

1. An armored cable termination/fiber-optic seal which connects a fiber optic cable comprising one or more armor wires and one or more cable tubes to a pressure housing, the armored cable termination/fiber-optic seal comprising:

an armored termination which locks the one or more armor wires in a conical cavity, the conical cavity comprising a conically-shaped void space within the armored cable termination/fiber optic seal, the armored termination further comprising a wedge cone comprising one or more tube paths which allow one or more cable tubes to pass through and a cone-shaped surface which one or more armor wires may be wrapped around;

sealing paths which block water from traveling in an interstitial space between the one or more armor wires and the one or more cable tubes into the pressure housing; and one or more fiber feed-through tubes which block water from traveling in an interior of the one or more cable tubes into the pressure housing.

2. The armored cable termination/fiber-optic seal of claim 1, wherein:
the one or more cable tubes comprises a plurality of cable tubes, and
each of the plurality of cable tubes is isolated within the armored cable termination/fiberoptic seal which prevents an increase in pressure due to a breach in one of the plurality of cable tubes from affecting pressure levels in unbreached cable tubes.

3. The armored cable termination/fiber-optic seal of claim 1, wherein an exterior of the armored cable termination/fiber-optic seal and a portion of the fiber optic cable is covered by an overmold.

4. The armored cable termination/fiber-optic seal of claim 3, wherein overmold is one of among polyurethane and polyethylene.

5. The armored cable termination/fiber-optic seal of claim 3, further comprising an adhesive which secures the overmold to the exterior of the armored cable termination/fiber-optic seal.

6. The armored cable termination/fiber-optic seal of claim 5, further comprising potting flow channels which allow the adhesive which secures the overmold to the exterior of the armored cable termination/fiber-optic seal to enter the interior of the armored cable termination/fiber-optic seal.

7. The armored cable termination/fiber-optic seal of claim 1, further comprising an adhesive which joins a plurality of armor wires to the wedge cone to create an armor-wire adhesive composite.

8. The armored cable termination/fiber-optic seal of claim 7, wherein the armor wire-adhesive composite provides a connection between the fiber optic cable and the armored cable termination/fiber-optic seal which is stronger than the break strength of the fiber optic cable.

9. The armored cable termination/fiber-optic seal of claim 7, wherein the conical cavity comprises one or more channels which allow the adhesive forming the armor-wire adhesive composite to enter and reduce potential for rotation of the armor-wire-adhesive composite and the fiber optic cable.

10. The armored cable termination/fiber-optic seal of claim 7, further comprising a ground lug terminal which provides a connection to the one or more armor wires to create electrical continuity between the armor wires, the armored cable termination/fiber-optic seal, and the pressure housing.

11. The armored cable termination/fiber-optic seal of claim 1, further comprising a spacer which forms a void space between the spacer and the conical cavity, wherein the one or more cable tubes are routed through holes in the spacer and the sealing paths comprise an adhesive in the void space between the spacer and the conical cavity.

12. The armored cable termination/fiber-optic seal of claim 11, wherein the spacer comprises a cap portion made of a material which bonds to the adhesive in the void space between the spacer and the conical cavity.

13. The armored cable termination/fiber-optic seal of claim 11, further comprising a first O-ring surrounding the spacer which blocks water from traveling into the pressure housing.

14. The armored cable termination/fiber-optic seal of claim 1, wherein the sealing paths further comprise elastomeric tubing applied over the one or more cable tubes to form a band seal.

15. The armored cable termination/fiber-optic seal of claim 1, wherein the sealing paths comprise one or more Morrison seals which independently seal each of the one or more cable tubes.

16. The armored cable termination/fiber-optic seal of claim 1, further comprising a termination body,
wherein the one or more fiber feed-through tubes are attached to the termination body by a threaded connection.

17. The armored cable termination/fiber-optic seal of claim 16, wherein the fiber feed-through tubes are attached to the termination body by a removable connection which allows access to window strip cladding from optical fiber during assembly.

18. The armored cable termination/fiber-optic seal of claim 16, wherein the fiber feed-through tubes comprise an inner bore geometry which minimizes strain forces applied to optical fiber when subjected to differential external forces.

19. The armored cable termination/fiber-optic seal of claim 16, further comprising a second O-ring surrounding the termination body which blocks water from traveling into the pressure housing.

20. The armored cable termination/fiber-optic seal of claim 16, further comprising a threaded retaining ring which retains the termination body within the armored cable termination/fiber-optic seal.

21. The armored cable termination/fiber-optic seal of claim 1, wherein the one or more fiber feed-through tubes are filled with a water-resistant adhesive.

22. The armored cable termination/fiber-optic seal of claim 1, wherein the armored cable termination/fiber-optic seal is scalable to accommodate cable tubes of varying diameters.

23. A method of attaching a fiber optic cable comprising one or more armor wires and one or more cable tubes to a pressure housing, the method comprising:
cutting the fiber optic cable;
attaching the fiber optic cable to an armored cable termination/fiber-optic seal comprising:
an armored termination which locks the one or more armor wires in a conical cavity, the conical cavity comprising a conically-shaped void space within the armored cable termination/fiber optic seal, the armored termination further comprising a wedge cone comprising one or more tube paths which allow one or more cable tubes to pass through and a cone-shaped surface which one or more armor wires may be wrapped around;
sealing paths which block water from traveling in an interstitial space between the one or more armor wires and the one or more cable tubes into the pressure housing; and
one or more fiber feed-through tubes which block water from traveling in an interior of the one or more cable tubes into the pressure housing; and attaching the armored cable termination/fiber-optic seal to a pressure housing.

24. The method of claim 23, wherein:
the one or more cable tubes comprises a plurality of cable tubes, and
each of the plurality of cable tubes is isolated within the armored cable termination/fiber optic seal which prevents an increase in pressure due to a breach in one of the plurality of cable tubes from affecting the pressure level in an unbreached cable tubes.

25. The method of claim 23, further comprising covering the armored cable termination/fiber-optic seal and a portion of the fiber optic cable with an overmold.

26. The method of claim 25, wherein overmold is one of among polyurethane and polyethylene.

27. The method of claim 25, further comprising applying an adhesive to secure the overmold to the exterior of the armored cable termination/fiber-optic seal.

28. The method of claim 27, wherein the armored cable termination/fiber-optic seal further comprises potting flow channels which allow the adhesive which secures the overmold to the exterior of the armored cable termination/fiber-optic seal to enter the interior of the armored cable termination/fiber-optic seal.

29. The method of claim 23, further comprising:
wrapping a plurality of armor wires around a wedge cone within the conical cavity.

30. The method of claim 29, further comprising applying an adhesive to join the plurality of armor wires to the wedge cone to create an armor-wire-adhesive-composite.

31. The method of claim 30, wherein the armor-wire-adhesive composite provides a connection between the fiber optic cable and the armored cable termination/fiber-optic seal which is stronger than the break strength of the fiber optic cable.

32. The method of claim 30, wherein the conical cavity comprises one or more channels which allow the adhesive which forms the armor-wire-adhesive composite to enter and reduce potential for rotation of the armor-wire-adhesive composite and the fiber optic cable.

33. The method of claim 30, further comprising one or more armor wires to a ground lug terminal which provides electrical continuity between the armor wires, the armored cable termination/fiber-optic seal, and the pressure housing.

34. The method of claim 29, further comprising: routing the one or more cable tubes holes in a spacer,
wherein the spacer forms a void space between the spacer and the conical cavity: and
the sealing paths further comprise an adhesive in the void space between the spacer and the conical cavity.

35. The method of claim 34, wherein the spacer comprises a cap portion made of a material which bonds to the adhesive in the void space between the spacer and the conical cavity.

36. The method of claim 34, further comprising installing a first O-ring which surrounds the spacer and blocks water from traveling into the pressure housing.

37. The method of claim 23, further comprising applying elastormeric tubing applied over the one or more cable tubes to form a band seal.

38. The method of claim 23, further comprising attaching individual Morrison seals to each of the one or more cable tubes.

39. The method of claim 23, further comprising attaching one or more fiber feedthrough tubes to a termination body within the armored cable termination/fiber-optic seal by a threaded connection.

40. The method claim 39, wherein the attaching the one or more fiber feed-through tubes comprises removably attaching the fiber feed-through tubes to allow access to window strip cladding from optical fiber during assembly.

41. The method of claim 39, wherein the fiber feed-through tubes comprise an inner bore geometry which minimizes strain forces applied to optical fiber when subjected to differential external forces.

42. The method of claim 39, further comprising installing a second O-ring to surround the termination body and block water from traveling into the pressure housing.

43. The method of claim 39, further comprising threading a retaining ring which retains the termination body within the armored cable termination/fiber-optic seal into the armored cable termination/fiber-optic seal.

44. The method of claim 23, further comprising filling the one or more fiber feedthrough tubes with a water-resistant adhesive.

45. The method of claim 23, wherein the armored cable termination/fiber-optic seal is scalable to accommodate cable tubes of varying diameters.

46. An armored cable termination/fiber-optic seal which connects a fiber optic cable comprising one or more armor wires and a plurality of cable tubes to a pressure housing, the armored cable termination/fiber-optic seal comprising:
an armored termination which locks the one or more armor wires in a conical cavity;
sealing paths which block water from traveling in an interstitial space between the one or more armor wires and the plurality of cable tubes into the pressure housing; and
one or more fiber feed-through tubes which block water from traveling in an interior of the plurality of cable tubes into the pressure housing,
wherein each of the plurality of cable tubes is isolated within the armored cable termination/fiber optic seal which prevents an increase in pressure due to a breach in one of the plurality of cable tubes from affecting pressure levels in unbreached cable tubes.

47. The armored cable termination/fiber-optic seal of claim 46, wherein an exterior of the armored cable termination/fiber-optic seal and a portion of the fiber optic cable is covered by an overmold.

48. The armored cable termination/fiber-optic seal of claim 46, wherein the sealing paths further comprise elastomeric tubing applied over the one or more cable tubes to form a band seal.

49. The armored cable termination/fiber-optic seal of claim 46, wherein the sealing paths comprise one or more Morrison seals which independently seal each of the one or more cable tubes.

50. The armored cable termination/fiber-optic seal of claim 46, further comprising a termination body,
wherein the one or more fiber feed-through tubes are attached to the termination body by a threaded connection.

51. The armored cable termination/fiber-optic seal of claim 46, wherein the one or more fiber feed-through tubes are filled with a water-resistant adhesive.

52. The armored cable termination/fiber-optic seal of claim 46, wherein the armored cable termination/fiber-optic seal is scalable to accommodate cable tubes of varying diameters.

* * * * *